US011719129B2

(12) United States Patent
Svihla et al.

(10) Patent No.: US 11,719,129 B2
(45) Date of Patent: Aug. 8, 2023

(54) COMPRESSOR HOUSING

(71) Applicant: Progress Rail Locomotive Inc., LaGrange, IL (US)

(72) Inventors: Gary R. Svihla, Burr Ridge, IL (US); Shannon W. Omori, Evanston, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 17/524,518

(22) Filed: Nov. 11, 2021

(65) Prior Publication Data

US 2023/0142571 A1 May 11, 2023

(51) Int. Cl.
*F01D 25/24* (2006.01)
*F01D 21/04* (2006.01)
*F01D 25/28* (2006.01)

(52) U.S. Cl.
CPC ........... *F01D 25/24* (2013.01); *F01D 21/045* (2013.01); *F01D 25/28* (2013.01); *F05D 2220/40* (2013.01); *F05D 2230/64* (2013.01); *F05D 2240/14* (2013.01); *F05D 2260/30* (2013.01)

(58) Field of Classification Search
CPC ............. F04D 29/4226; F04D 29/4233; F04D 29/442; F04D 29/444; F04D 29/40; F04D 29/403; F04D 29/4206; F01D 21/045; F01D 25/24; F05D 2220/40; F05D 2240/14; F05D 2230/60
See application file for complete search history.

(56) References Cited

U.S. PATENT DOCUMENTS

| 4,721,441 A | 1/1988 | Miyashita et al. |
| 6,032,466 A | 3/2000 | Woollenweber et al. |
| 6,364,634 B1 | 4/2002 | Svihla et al. |
| 6,499,884 B1 | 12/2002 | Svihla et al. |

(Continued)

FOREIGN PATENT DOCUMENTS

| CH | 712614 B1 | 11/2020 |
| CN | 205841303 U | 12/2016 |

(Continued)

OTHER PUBLICATIONS

Written Opinion and International Search Report for Int'l. Patent Appln. No. PCT/US2022/079429, dated Feb. 8, 2022 (12 pgs).

*Primary Examiner* — Eldon T Brockman
*Assistant Examiner* — Maxime M Adjagbe

(57) ABSTRACT

Disclosed is a compressor housing and method of assembling. The compressor housing may comprise an outer volute, a cavity, an impeller cover, a compressor diffuser and an inner volute. The outer volute includes a back wall and a curved casing. The back wall may include a receptacle and a first plurality of annular steps. The receptacle configured to receive an alignment pin. The cavity is configured to receive the compressor impeller and is at least partially defined by the back wall of the outer volute and the impeller cover. The impeller cover is configured to fragment during impact with the compressor impeller during a failure condition of the compressor impeller. The impeller cover is disposed between the inner volute and the cavity. The compressor diffuser is disposed between the back wall and the impeller cover.

20 Claims, 6 Drawing Sheets

(56) References Cited

U.S. PATENT DOCUMENTS

| | | |
|---|---|---|
| 6,499,969 B1 * | 12/2002 | Tombers .................. F01D 5/066 417/407 |
| 6,896,479 B2 | 5/2005 | Svihla et al. |
| 7,108,488 B2 | 9/2006 | Larue et al. |
| 7,371,047 B2 | 5/2008 | Burmester et al. |
| 8,128,865 B2 | 3/2012 | Jahnz et al. |
| 8,820,072 B2 | 9/2014 | Figura et al. |
| 8,858,156 B2 | 10/2014 | Swenson et al. |
| 9,127,690 B2 | 9/2015 | Knaack |
| 9,181,855 B2 | 11/2015 | Svihla et al. |
| 9,200,567 B2 | 12/2015 | Parker et al. |
| 9,279,343 B2 | 3/2016 | Knaack |
| 9,470,240 B2 | 10/2016 | Uneura |
| 9,482,240 B2 | 11/2016 | Gerard et al. |
| 9,546,563 B2 | 1/2017 | Panambur et al. |
| 9,726,020 B2 | 8/2017 | Loewenberg |
| 9,835,164 B2 | 12/2017 | Svihla et al. |
| 9,874,099 B2 | 1/2018 | Rexavier et al. |
| 9,915,172 B2 | 3/2018 | Annati et al. |
| 9,995,179 B2 * | 6/2018 | Svihla .................. F04D 29/444 |
| 10,018,205 B2 | 7/2018 | Pinkney et al. |
| 10,119,417 B2 | 11/2018 | Bucking |
| 10,161,265 B2 | 12/2018 | Isayama et al. |
| 10,436,211 B2 | 10/2019 | McArdle et al. |
| 10,677,099 B2 | 6/2020 | Hossbach |
| 2010/0143111 A1 | 6/2010 | Kuehnel |
| 2010/0215506 A1 | 8/2010 | Heyes et al. |
| 2016/0097302 A1 | 4/2016 | Svihla et al. |
| 2016/0177960 A1 | 6/2016 | Svihla et al. |
| 2016/0177965 A1 | 6/2016 | Svihla et al. |
| 2016/0215790 A1 * | 7/2016 | Beers .................... F04D 29/441 |
| 2017/0002828 A1 | 1/2017 | Rexavier et al. |
| 2018/0223871 A1 * | 8/2018 | Makino ................. F04D 29/624 |
| 2018/0328373 A1 | 11/2018 | Aynacioglu et al. |
| 2020/0182137 A1 | 6/2020 | Carr et al. |
| 2021/0156304 A1 | 5/2021 | Kobielski et al. |

FOREIGN PATENT DOCUMENTS

| | | |
|---|---|---|
| CN | 207728444 U | 8/2018 |
| DE | 102015216319 A1 | 3/2017 |
| EP | 1383987 B1 | 1/2006 |
| EP | 2865897 B1 | 4/2016 |
| EP | 3051144 | 8/2016 |
| JP | 3587350 B2 | 11/2004 |
| JP | 5598433 B2 | 10/2014 |

* cited by examiner

COMPRESSOR HOUSING

TECHNICAL FIELD

The present disclosure relates generally to turbochargers and, more particularly, to turbochargers with burst containment in the event of compressor impeller failure.

BACKGROUND

Internal combustion engines, for example, diesel engines, gasoline engines, or natural gas engines, employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a shaft, a turbine wheel connected to one end of the shaft, a compressor impeller (sometimes referred to as a compressor wheel) connected to the other end of the shaft, and bearings to support the shaft. Separate housings connected to each other enclose the compressor impeller, the turbine wheel and the bearings. Exhaust from the engine expands over the turbine wheel and rotates the turbine wheel. The turbine wheel in turn rotates the compressor impeller via the shaft. The compressor impeller receives cool air from the ambient surroundings and forces compressed air into combustion chambers of the engine.

Natural inherent material limitations, wear and tear of the compressor or turbine stage components, excessive speeds, or debris in the exhaust air or the intake air may cause the turbine wheel or the compressor impeller to fail. To prevent ejection of debris or oil in the event of a turbine wheel or compressor impeller failure, turbochargers typically rely on massive housings surrounding the wheels to absorb the tremendous amount of energy released during the failure. The massive housings, however, tend to increase the volume, weight and cost of the turbocharger.

U.S. Publication No. 2021/0156304 that published May 27, 2021 ("the '304 publication") discloses various systems and methods for a shroud of a turbomachine. In one example, a turbomachine includes a case and a rotor rotatably coupled to the case and configured to transfer energy between the rotor and a working fluid. The case includes a shroud housing the rotor, the shroud including an inner shell, an outer shell, and a lattice structure positioned between the inner shell and the outer shell. When beneficial, a better shroud for containment of an impeller during a failure condition is desired.

SUMMARY OF THE DISCLOSURE

In one aspect of the present disclosure, a compressor housing is disclosed for a turbocharger that includes a rotatable compressor impeller having a bore therethrough. The compressor housing may comprise an outer volute, a cavity, an impeller cover, a compressor diffuser and an inner volute. The outer volute is configured to be disposed about the bore. The outer volute includes a back wall and a curved casing. The curved casing defines an airflow-passageway. The back wall extends radially inward from the curved casing. The back wall may include a receptacle and a first plurality of annular steps. The receptacle configured to receive an alignment pin that positions a compressor diffuser in the compressor housing. The cavity is at least partially defined by the back wall of the outer volute and the impeller cover. The cavity is configured to receive the compressor impeller. The impeller cover is configured to fragment during impact with the compressor impeller during a failure condition of the compressor impeller. The impeller cover is disposed between the inner volute and the cavity. The compressor diffuser is disposed between the back wall and the impeller cover. The compressor diffuser includes an annular body, a plurality of fins and the alignment pin, the fins disposed between the annular body and the impeller cover. The alignment pin is disposed in the receptacle of the back wall of the outer volute. The inner volute is disposed between the outer volute and the impeller cover. The inner volute includes a bridge and an inner ring. The bridge extends between a first end and a second end of the impeller cover. The bridge and the impeller cover define a chamber. The inner ring and the bridge and the impeller cover define a pocket-void disposed inside the chamber.

In another aspect of the present disclosure, a method of assembling a compressor housing is disclosed for a turbocharger that includes a rotatable compressor impeller including a bore therethrough. The method may comprise disposing the outer volute about the turbocharger shaft. The outer volute includes a back wall and a curved casing. The curved casing defines an airflow-passageway. The back wall extends radially inward from the curved casing. The back wall includes a receptacle and a first plurality of annular steps. The receptacle is configured to receive an alignment pin that positions a compressor diffuser in the compressor housing. The method may further comprise arranging the back wall of the outer volute and an impeller cover to at least partially form a cavity configured to receive the compressor impeller, wherein the impeller cover is disposed between an inner volute and the cavity, and the impeller cover is configured to fragment during impact with the compressor impeller during a failure condition of the compressor impeller. The method may further comprise disposing a compressor diffuser between the back wall and the impeller cover, the compressor diffuser including an annular body, a plurality of fins and the alignment pin, the fins disposed between the annular body and the impeller cover, the alignment pin disposed in the receptacle of the back wall of the outer volute. The method may further comprise disposing an inner volute between the outer volute and the impeller cover. The inner volute includes a bridge and an inner ring. The bridge extends between a first end and a second end of the impeller cover. The bridge and the impeller cover define a chamber. The inner ring and the bridge and the impeller cover define a pocket-void disposed inside the chamber.

In a further aspect of the present disclosure, a turbocharger is disclosed. The turbocharger may include a rotatable turbocharger shaft, a compressor impeller and a compressor housing. The compressor impeller is disposed in a cavity and is mounted via the stud coupled to the rotatable turbocharger shaft. The compressor impeller includes a nose end, a hub end and a plurality of blades disposed between the nose end and the hub end. Each blade has a rim. The compressor housing comprises an outer volute, a cavity, an impeller cover, a compressor diffuser and an inner volute. The outer volute is arranged about the stud. The outer volute includes a back wall and a curved casing. The curved casing defines an airflow-passageway. The back wall extends radially inward from the curved casing. The back wall is proximal to and spaced apart from the compressor impeller. The back wall includes a receptacle and a first plurality of annular steps. The receptacle is configured to receive an alignment pin that positions a compressor diffuser in the compressor housing. The cavity is at least partially defined by the back wall of the outer volute and by an impeller cover. The impeller cover is configured to fragment during impact with the compressor impeller during a failure condition of the compressor impeller. The impeller cover is disposed between the inner volute and the compressor impeller. The compressor diffuser is disposed between the back wall and the impeller cover. The compressor diffuser includes an annular body, a fin and the alignment pin. The fin extending from the annular body to the impeller cover. The alignment pin disposed in the receptacle of the back wall of the outer volute. The inner volute disposed between the outer volute and the impeller cover. The inner volute including a bridge and an inner ring. The bridge extending from a first end to a second end of the impeller cover. The bridge and the impeller cover defining a chamber. The inner ring and the bridge and the impeller cover defining a pocket-void disposed inside the chamber.

Additional aspects are defined by the claims of this patent.

DETAILED DESCRIPTION

Figure 1:
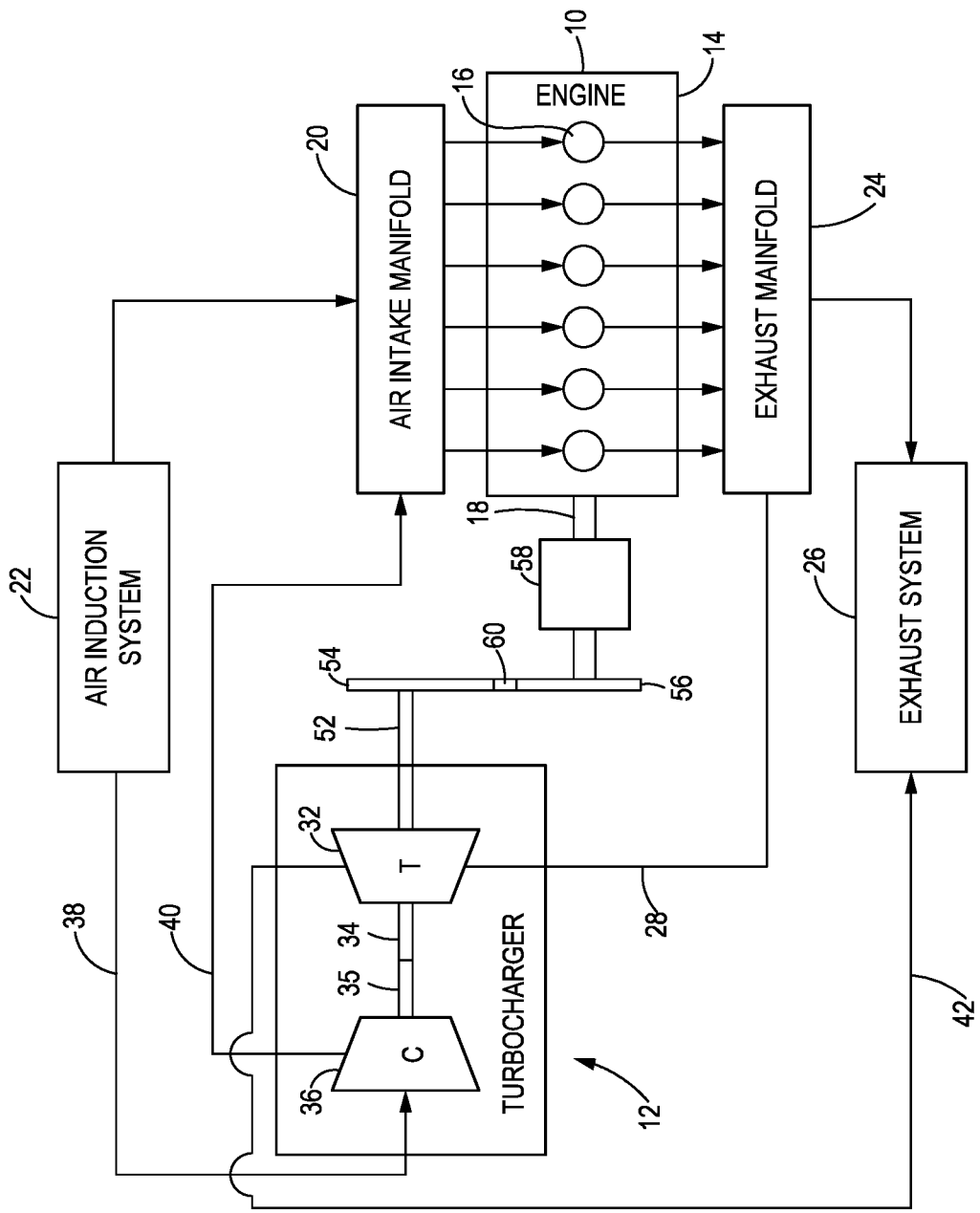
FIG. 1 is a schematic illustration of an exemplary internal combustion engine and a turbocharger in accordance with the present disclosure.

Referring to FIG. 1, an internal combustion engine 10 having an integrated turbocharger 12 in accordance with the present disclosure is illustrated schematically. The engine 10 may find applications in mobile machines (not shown) such as, but not limited to, vehicles, heavy mechanical equipment, large tractors, on-road vehicles, off-road vehicles, marine vessels and the like, and in stationary machines such as generator sets and pumps. The engine 10 may include a crankcase 14 that forms a plurality of compression cylinders 16. While six compression cylinders 16 are shown in an inline arrangement for illustration purposes, fewer or more compression cylinders 16 arranged in inline or alternative configurations within the crankcase 14, for example in a V-configuration, may be used. Each compression cylinder 16 may include a reciprocating piston (not shown) connected to a common engine output shaft 18. In the engine 10, the combustion of a fuel and air mixture in the compression cylinders 16 generates motive power that rotates the engine output shaft 18, and a resultant mixture of exhaust gas is produced as is known in the art.

The engine 10 may include an air intake manifold 20 that is selectively in fluid communication with each compression cylinder 16 and provides compressed intake air to the compression cylinders 16. Air may be provided to air intake manifold 20 by an air induction system 22 that draws air from the ambient atmosphere surrounding the engine 10 and the machine in which the engine 10 is implemented. The engine 10 may include a fuel tank (not shown) to store suitable fuel for combustion in the compression cylinders 16 of the engine 10. In various embodiments, the engine 10 may be configured to combust gasoline, diesel fuel, natural gas (liquefied or compressed) or other combustible energy sources, and the fuel tank will be configured as appropriate to store the fuel and provide the fuel to the engine 10 as required and known in the art. Compressed air from the air intake manifold 20 along with the fuel from the fuel tank provided to the compression cylinders 16 forms a combustible mixture that ignites when compressed or in the presence of a spark. Combustion byproducts are evacuated from each compression cylinder 16 through exhaust valves (not shown) to an exhaust manifold 24 that collects the exhaust gas from each compression cylinder 16, and at least a portion of the exhaust gases may be transmitted to an exhaust system 26 for after treatment prior to being released back into the atmosphere. In the engine 10, the intake air in the air intake manifold 20 as well as the exhaust gas released to the exhaust manifold 24 are under pressure.

In the illustrated embodiment, the turbocharger 12 is integrated with the engine 10 to provide compressed air with greater pressure to the air intake manifold 20. As schematically illustrated in FIG. 1, the turbocharger 12 may be fluidly connected to the exhaust manifold 24 and arranged to receive pressurized exhaust gas therefrom via a high pressure exhaust gas line 28. A turbocharger housing 30 of the turbocharger 12 is configured so that the pressurized exhaust gas from the high pressure exhaust gas line 28 acts on a turbine wheel 32 mounted on a turbocharger shaft 34 within the turbocharger housing 30. The turbocharger 12 may further include a compressor impeller 36 mounted via a stud 35 (FIG. 3) that is coupled to the turbocharger shaft 34 for rotation with the turbocharger shaft 34 and the turbine wheel 32. The pressurized exhaust gas from the high pressure exhaust gas line 28 is directed at the turbine wheel 32 to create exhaust torque on the turbocharger shaft 34. When the exhaust gas temperature and pressure are sufficient, the exhaust torque causes the turbine wheel 32 to rotate the turbocharger shaft 34 and stud 35 and the compressor impeller 36. The compressor stage 62 (FIG. 3) of the turbocharger 12 (FIG. 1) in which the compressor impeller 36 is disposed may receive air from the air induction system 22 via a low pressure air line 38. The rotating compressor impeller 36 compresses the air from the air induction system 22 and outputs compressed air to the air intake manifold 20 via a high pressure air line 40 for addition to the air coming directly from the air induction system 22 and the fuel from the fuel tank (not shown). After powering the turbine wheel 32, the spent exhaust gas is discharged to the exhaust system 26 via a low pressure exhaust gas return line 42.

During some operating conditions of the engine 10, it may be desirable to drive the turbine wheel 32 of the turbocharger 12 even though the temperature and pressure of the exhaust gas in the high pressure exhaust gas line 28 are insufficient to rotate the turbine wheel 32 or to rotate the turbine wheel 32 at a desired speed. For example, at low engine speeds such as when the engine 10 is idling, emissions of pollutants such as nitrous oxides (NOx) can increase and low exhaust temperatures can make exhaust after treatment systems in the exhaust system 26 ineffective. In one exemplary embodiment, to selectively provide direct drive to the turbocharger 12 by the engine 10 when the operating conditions dictate, the engine output shaft 18 may drive the turbocharger shaft 34 when the exhaust gas will not drive the turbine wheel 32, and may be disengaged when the exhaust gas will create sufficient torque and rotate the turbine wheel 32 and the compressor impeller 36 at sufficient speeds so that direct drive by the engine 10 is unnecessary.

In an embodiment, a carrier shaft 52 may be operatively coupled to the turbine wheel 32 and may have a carrier drive gear 54 mounted thereon and rotatable therewith. An operative connection between the engine 10 may be provided by a turbocharger drive gear 56 connected to a gear train or transmission 58 that is driven by the engine output shaft 18. The turbocharger drive gear 56 is operatively connected to the carrier drive gear 54 by one or more idler gears 60 so that the carrier shaft 52 will spin at a desired speed and direction relative to the engine output shaft 18. In other embodiments that utilize the compressor housing 66 disclosed herein, other appropriate drive mechanisms and arrangements may be utilized to drive the turbine wheel 32 and compressor impeller 36.

Figure 2:
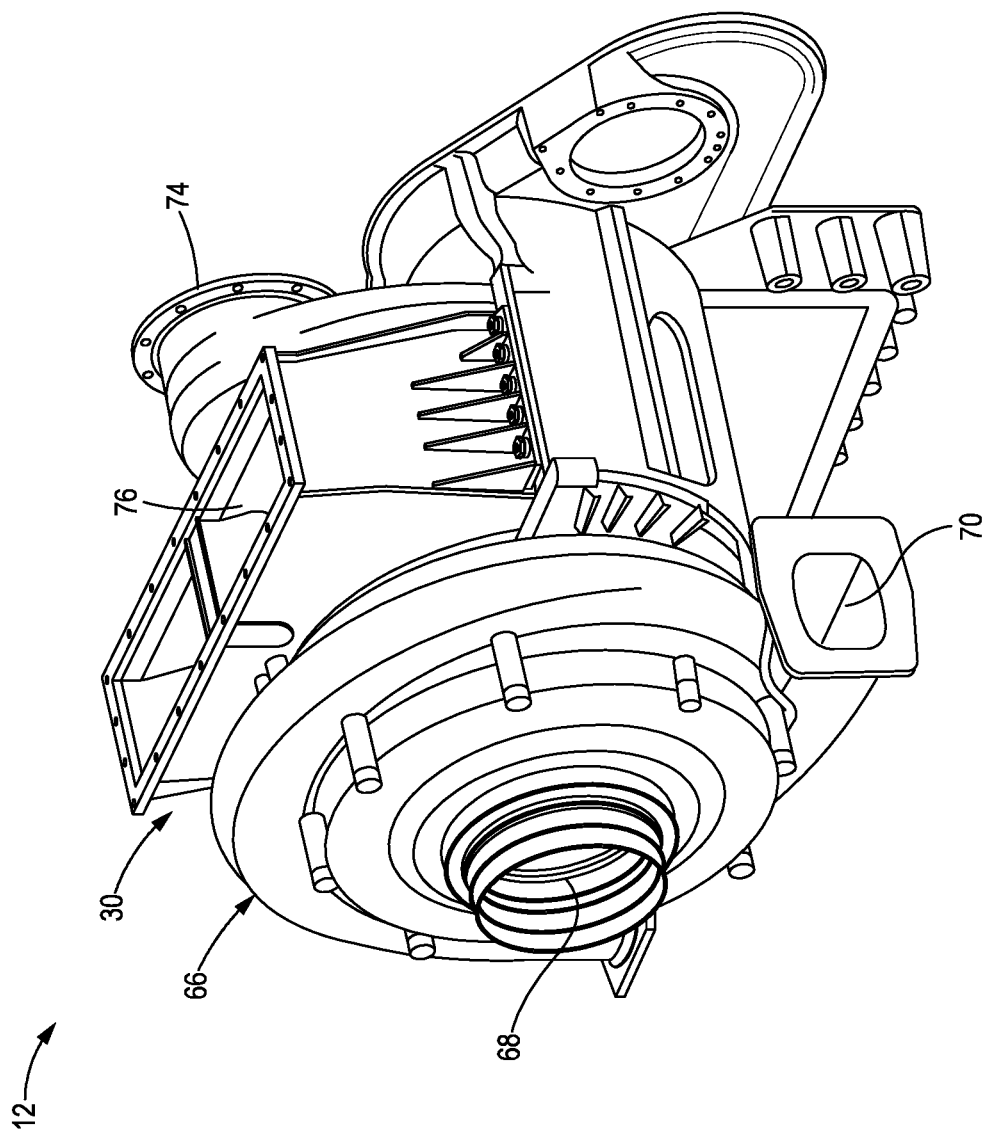
FIG. 2 is perspective view of an exemplary configuration of the turbocharger of FIG. 1.
Figure 3:
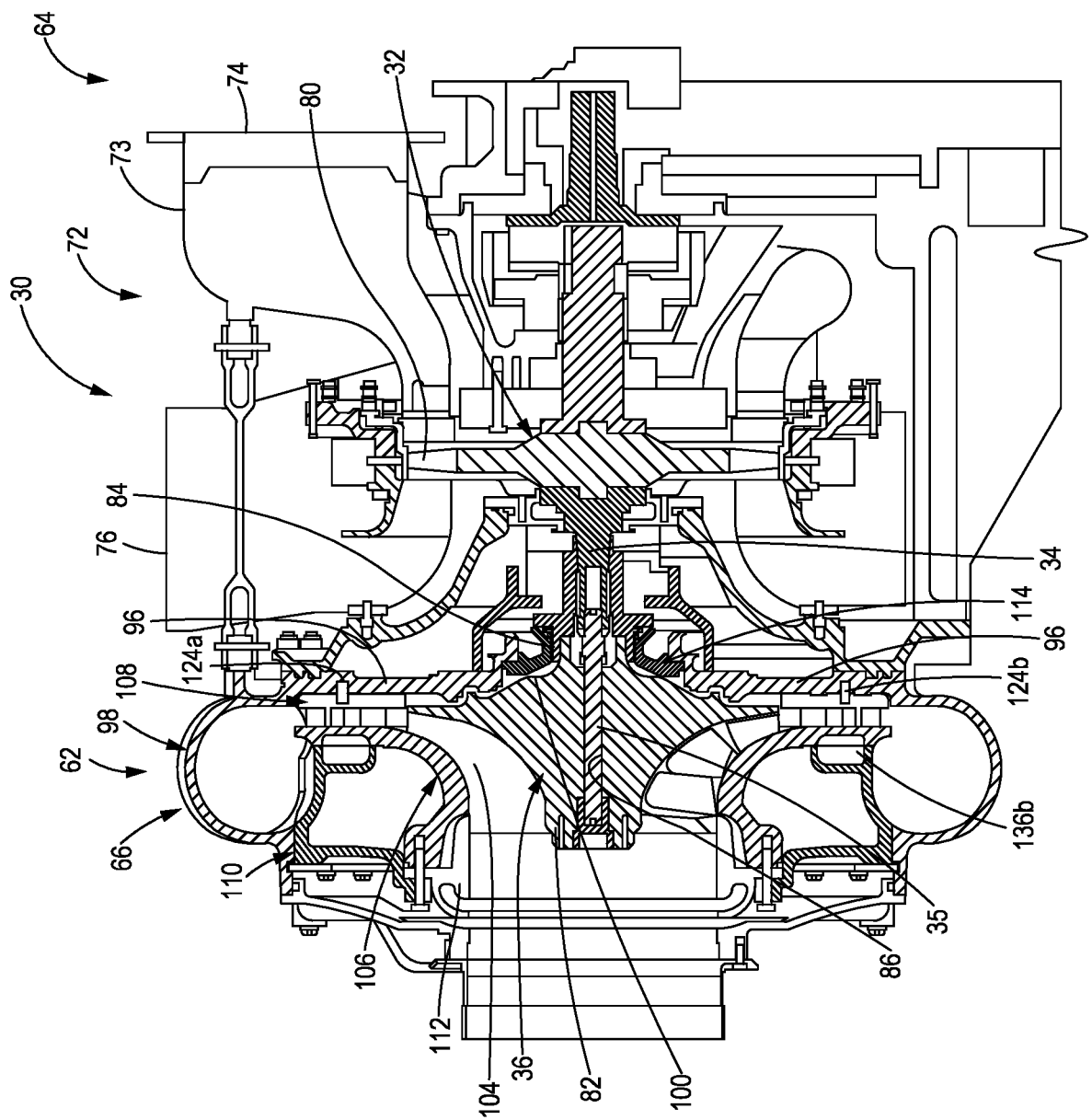
FIG. 3 is a sectional view of an exemplary configuration of the turbocharger of FIG. 2.

FIGS. 2-3 illustrate an exemplary embodiment of a turbocharger 12 that may be implemented with the engine 10 of FIG. 1. As shown in FIG. 3, turbocharger 12 may include a compressor stage 62 and a turbine stage 64 disposed in the turbocharger housing 30 (FIGS. 2-3). The turbocharger housing 30 comprises a compressor housing 66 and a turbine housing 72. The compressor stage 62 may embody a fixed geometry compressor impeller 36 (FIG. 3) attached via the stud 35, which is coupled to the turbocharger shaft 34, and configured to compress air received from the air induction system 22 (FIG. 1) to a predetermined pressure level before the air enters the engine 10 for combustion. Air may enter a compressor housing 66 (FIG. 2) via a compressor inlet 68 and exit the compressor housing 66 via a compressor outlet 70 (FIG. 2). As air moves through the compressor stage 62 (FIG. 3), the compressor impeller 36 may increase the pressure of the air which may be directed into the engine 10 (FIG. 1).

The turbine stage 64 (FIG. 3) may include a turbine housing 72 and a turbine wheel 32 that may be operably connected to the turbocharger shaft 34 (which may comprise one or more shafts operably coupled). Exhaust gases exiting the engine 10 (FIG. 1) may enter the turbine scroll 73 (FIG. 3) via the turbine inlet 74 (FIG. 3) and flow toward the turbine exhaust duct 76. The exhaust gases exit the turbine housing 72 via the turbine exhaust duct 76. As the hot exhaust gases move through the turbine housing 72 and expand against the blades 80 of the turbine wheel 32, the turbine wheel 32 may rotate the compressor impeller 36 via the operable connection of the turbocharger shaft 34 and the stud 35. The hot exhaust gases may also heat the compressor housing 72, which in turn may heat the compressor housing 66 and other components of the turbocharger 12 attached to or located near the turbine housing 72.

As best seen in FIG. 3, the compressor impeller 36 includes a nose end 82, a hub end 84, a bore 86 extending from the nose end 82 to the hub end 84, and a plurality of blades 88 (FIG. 4) disposed between the nose end 82 (FIG. 3) and the hub end 84. The bore 86 may be a centrally disposed bore that extends through the compressor impeller 36. In an embodiment the stud 35 is disposed inside the bore 86. Each blade 88 (FIG. 4) has a rim 90. The compressor impeller 36 may further include a balance ring 92 that projects outward from a back surface 94 of the compressor impeller 36 toward a back wall 96 of an outer volute 98 of the compressor housing 66. The compressor impeller 36 may further include a bulge portion 100 that generally disposed between the balance ring 92 (and the annular groove 102 of the back wall 96 in which the balance ring 92 is disposed (discussed below)) and the hub end 84 (FIG. 3). The bulge portion 100 (FIG. 4) slopes inward from the balance ring 92/annular groove 102 toward the hub end 84. (The bulge portion 100 is also disposed radially inward of the annular groove 102.)

The compressor housing 66 (FIGS. 3-4) may include the outer volute 98, a cavity 104, an impeller cover 106, a compressor diffusor 108, an inner volute 110, an insert 112 and a shaft seal 114.

Figure 4:
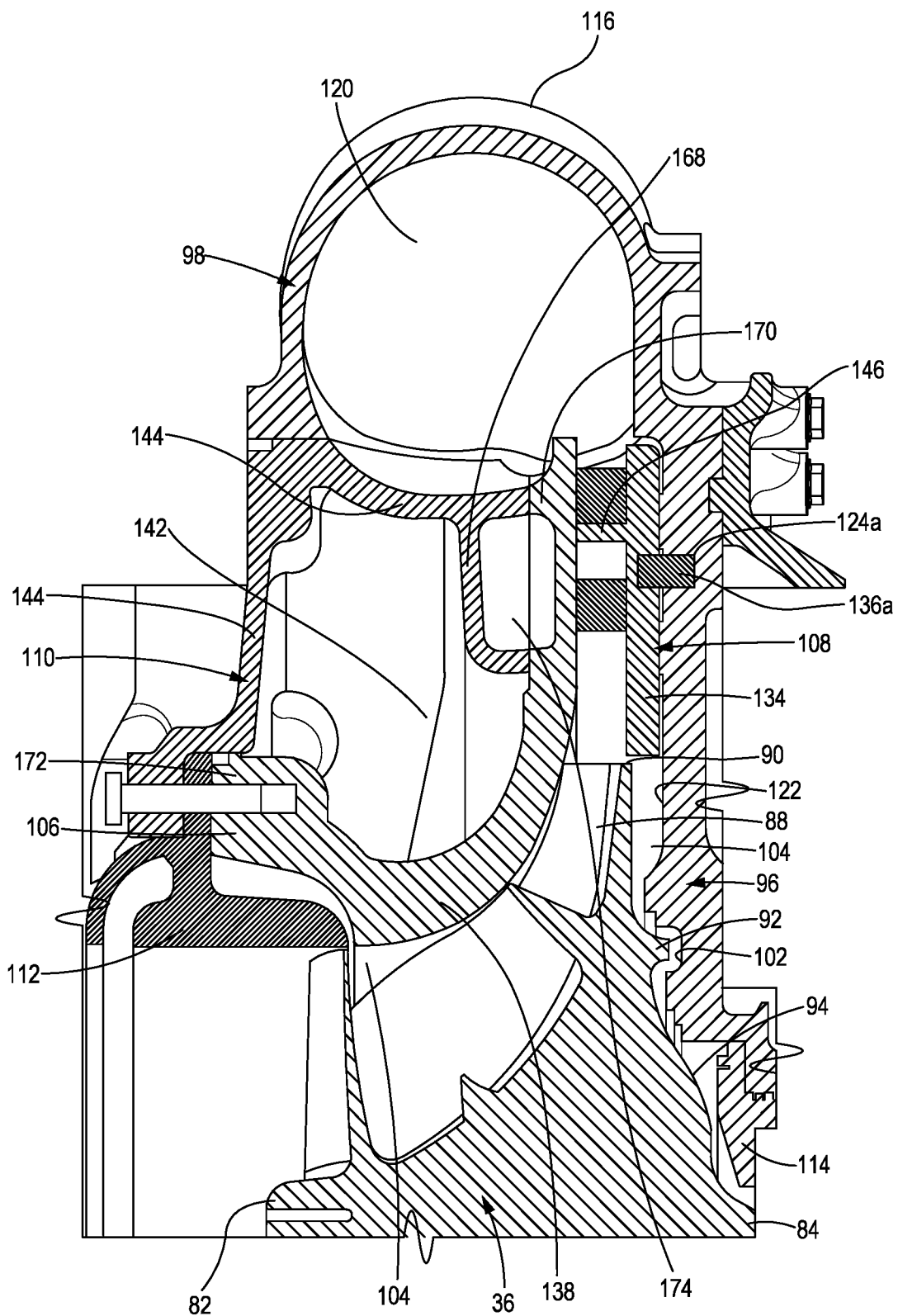
FIG. 4 is an enlarged view of a portion of FIG. 3.

The outer volute 98 (FIG. 3) is configured to be disposed about the stud 35. The outer volute 98 (FIG. 4) includes a back wall 96 and a curved casing 116. The curved casing 116 includes a base end 118 (FIG. 6) and a compressor outlet 70 (FIG. 2). The base end 118 (FIG. 6) is disposed adjacent to and radially outward of the compressor diffusor 108. The curved casing 116 (FIG. 4) defines an airflow-passageway 120 extending between the compressor diffusor 108 and the compressor outlet 70 (FIG. 2). The curved casing 116 (FIG. 4) of the outer volute 98 is configured to receive the (compressed) air that flows from the cavity 104 and through the compressor diffusor 108 to the airflow-passageway 120. The outer volute 98 is configured to discharge such air via the compressor outlet 70 (FIG. 2). The compressed air is generated by rotation of the compressor impeller 36 (FIG. 4). As discussed earlier herein, such discharged compressed air flows from the compressor outlet 70 (FIG. 2) into the high pressure air line 40 (FIG. 1) and to the air intake manifold 20.

The back wall 96 (FIG. 4) of the outer volute 98 extends radially inward from the curved casing 116 toward the turbocharger shaft 34 (FIG. 3). The back wall 96 (FIG. 4) includes a front surface 122 disposed proximal to the compressor impeller 36, and directly adjacent to the cavity 104 and the compressor diffuser 108. The back wall 96 is generally annular in shape and the front surface 122 includes a first receptacle 124a, a second receptacle 124b (FIG. 3), a first plurality of annular steps 126a (FIG. 5), a second plurality of annular steps 126b and an annular groove 102. The base end 118 (FIG. 6) and the front surface 122 of the back wall 96 define a recess 128 having a sidewall 130 and a floor 132. As shown in the embodiment of FIG. 6, an annular body 134 of the compressor diffuser 108 is disposed in the recess 128 to extend along the floor 132.

Each of the first receptacle 124a (FIG. 3) and the second receptacle 124b are configured to receive an alignment pin 136 (FIG. 5) and may be disposed radially outward of the first plurality of annular steps 126a, the second plurality of annular steps 126b and the annular groove 102. As best seen in FIG. 3. the second receptacle 124b may be disposed in the generally annular back wall 96 opposite to the first receptacle 124a. The first plurality of annular steps 126a (FIG. 5) may be radially nested (e.g., a first annular step of the first plurality disposed inside of a second annular step of the first plurality so that the second annular step of the first plurality is disposed radially outward of the first annular step of the first plurality). Similarly, the second plurality of annular steps 126b may be radially nested (e.g., a first annular step of the second plurality disposed inside of a second annular step of the second plurality so that the second annular step of the second plurality is disposed radially outward of the first annular step of the second plurality). The first plurality of annular steps 126a are disposed radially outward of the second plurality of annular steps 126b. The first plurality of annular steps 126a may be disposed radially outward of the balance ring 92 and the second plurality of annular steps 126b may be disposed radially inward of the balance ring 92. The annular groove 102 is disposed between the first plurality of annular steps 126a and the second plurality of annular steps 126b. The annular groove 102 is configured to receive the balance ring 92. As the balance ring 92 rotates with the rotation of the compressor impeller 36, the annular groove 102 is spaced apart from the balance ring 92. In the embodiment shown in FIG. 5, the annular groove 102 has a reciprocal shape to the shape of the balance ring 92.

The cavity 104 may be at least partially defined by the back wall 96 of the outer volute 98 (FIG. 4) and the impeller cover 106. The cavity 104 is configured to receive the compressor impeller 36.

The impeller cover 106 is sacrificial in nature and is configured to fragment during impact with the compressor impeller 36 during a failure condition of the compressor impeller 36 such as burst impeller (discussed later herein). A failure condition is one in which the compressor impeller 36 or portions thereof fracture and move in an uncontrolled manner in the cavity 104. The impeller cover 106 is disposed between the inner volute 110 (FIG. 4) and the cavity 104 (and the compressor impeller 36 within the cavity 104). In an embodiment, the impeller cover 106 may be made of a frangible material, such as a frangible metal or the like, to facilitate fracturing or shattering on impact. The impeller cover 106 includes a convex portion 138. The convex portion 138 is convex with respect to the cavity 104.

The compressor diffuser 108 is generally annular in shape and is disposed between the back wall 96 of the outer volute 98 and the impeller cover 106. The compressor diffuser 108 includes an annular body 134, a plurality of fins 146 and a first alignment pin 136a and a second alignment pin 136b (FIG. 3).

The annular body 134 (FIG. 6) includes a back side 148 adjacent to the front surface 122 of the back wall 96, a front side 150, an inner side 152 and an outer side 154. The outer side 154 is adjacent to the base end 118 of the curved casing 116 and is radially outward of the inner side 152. A base gap 156 may be disposed between the base end 118 and the outer side 154. One or more side gaps 158 may be disposed between the back side 148 of the annular body 134 and the front surface 122 of the back wall 96. As shown in FIG. 6, in an embodiment, one or more side gaps 158 may be generally slit-like in shape.

Figure 5:
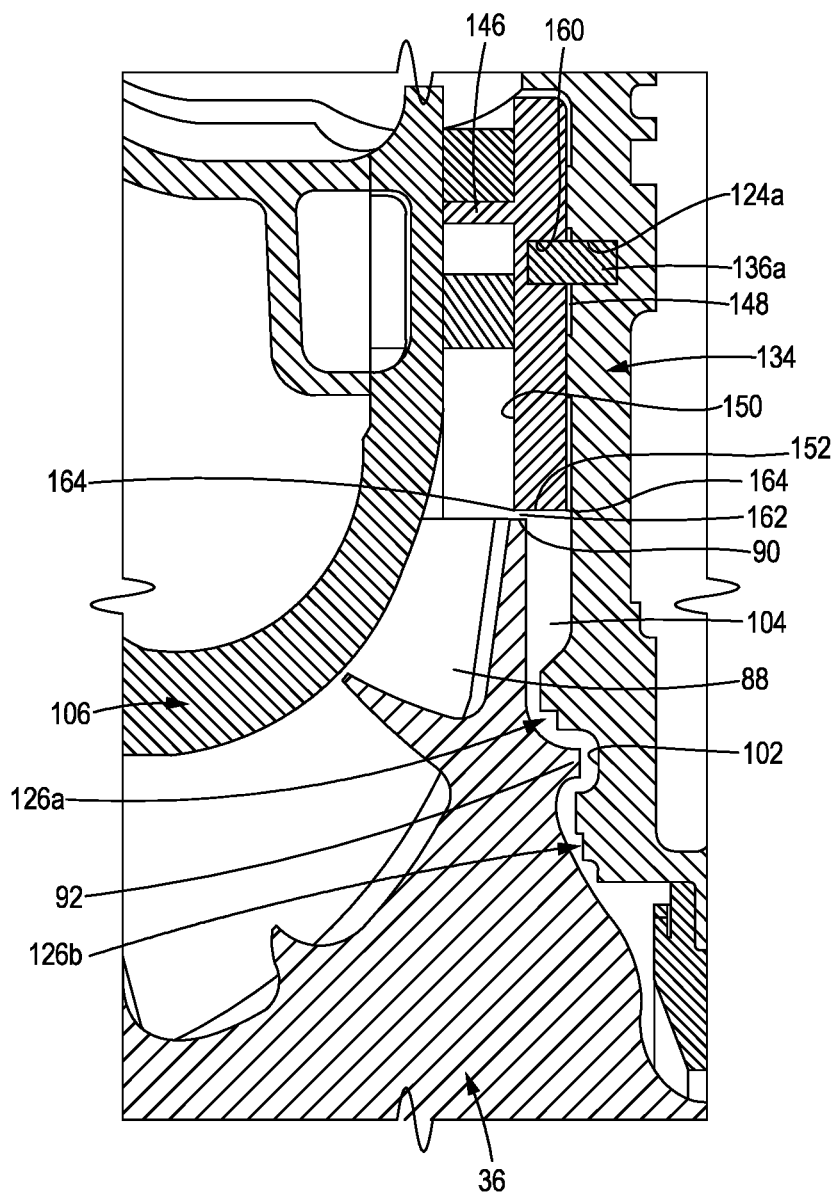
FIG. 5 is an enlarged view of a portion of FIG. 4.
Figure 6:
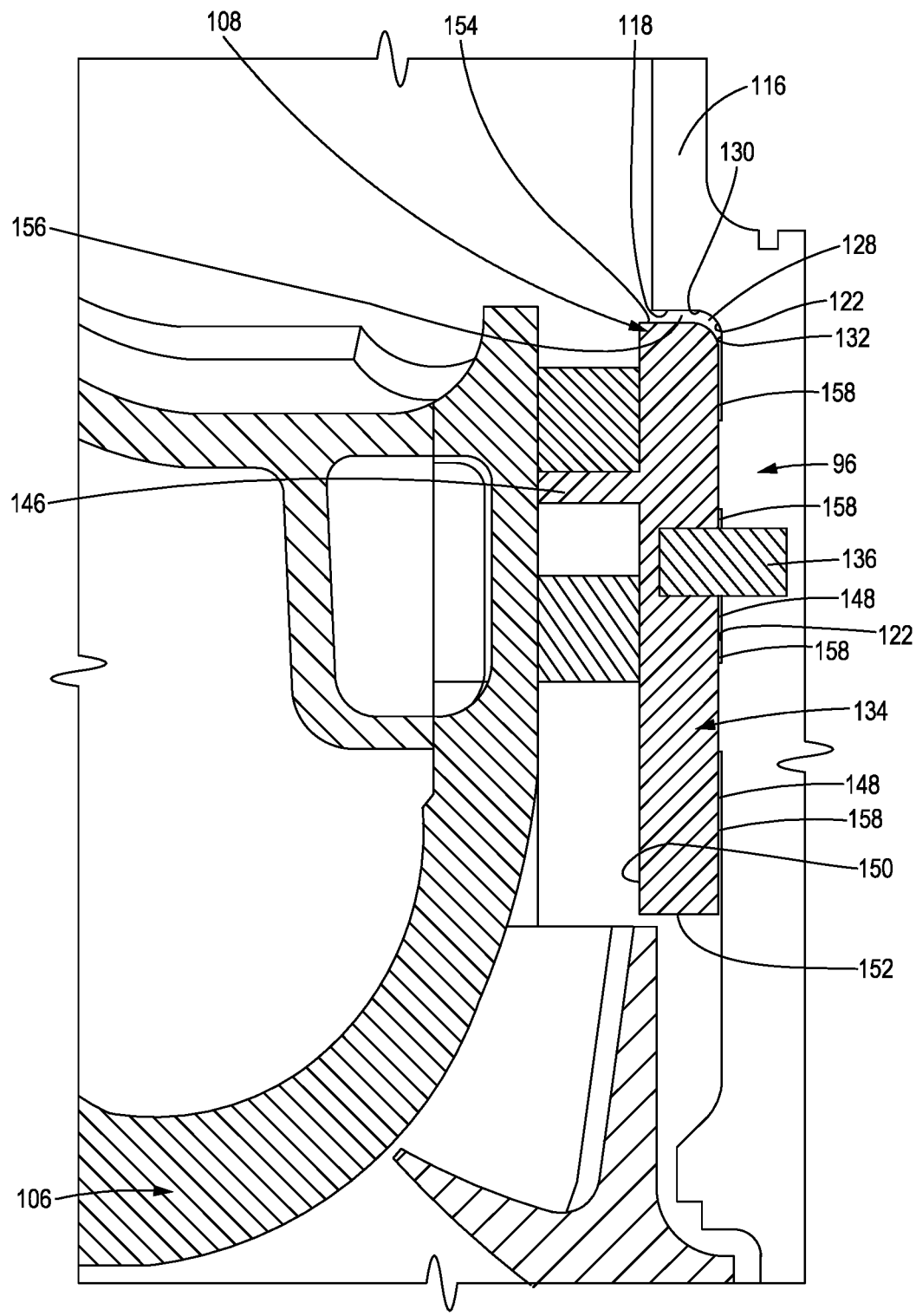
FIG. 6 is an enlarged view of a portion of FIG. 4.

In the embodiment shown in FIG. 5, there is shown a fin 146. Each fin 146 is disposed between the annular body 134 and the impeller cover 106. For example, in the embodiment of FIGS. 3, the fin 146 extends from the front side 150 of the annular body 134 to the impeller cover 106. The first alignment pin 136a is disposed in disposed in the first receptacle 124a and the second alignment pin 136b (FIG. 3) is disposed in the second receptacle 124b of the front surface 122 of the back wall 96 of the outer volute 98. The first and second alignment pins 136 (a,b) facilitate positioning of the compressor diffuser 108 in the compressor housing 66. The compressor diffuser 108 (FIG. 5) may also include one or more cut-outs 160 in the back side 148 of the annular body 134. Each cut-out 160 configured to receive one of the (first or second) alignment pins 136(a,b).

The compressor housing 66 further includes a blade gap 162 disposed directly between the (outer) rim 90 of each blade 88 and the inner side 152 of the annular body 134. The rim 90 is radially aligned with an inner corner 164 of the inner side 152 of the annular body 134. The outer corner 166 of the inner side 152 is radially aligned with the first plurality of annular steps 126a and is free of radial alignment with the rim 90 of each blade 88.

The inner volute 110 (FIG. 4) is disposed between the outer volute 98 and the impeller cover 106. The inner volute 110 is coupled to the outer volute 98 and includes a bridge 144 and an inner ring 168. The bridge 144 extends between a first end 170 and a second end 172 of the impeller cover 106. The bridge 144 and the impeller cover 106 define a chamber 142. The inner ring 168 together with a portion of the bridge 144 (between the inner ring 168 and the impeller cover 106) may be generally C-shaped. The inner ring 168 and the bridge 144 and the impeller cover 106 define a pocket-void 174 that is disposed inside the chamber 142. The pocket-void 174 may be hollow. The inner volute 110 is configured to resist movement of a (failed) compressor impeller 36 into the airflow-passageway 120 of the outer volute 98 in the event of a compressor impeller 36 failure such as burst impeller.

The insert 112 is disposed adjacent to the impeller cover 106 and is suspended in the cavity 104. The insert 112 is disposed radially outward from the nose end 82 of the compressor impeller 36. The insert 112 is configured to provide a radial stop to a fractured compressor impeller 36 during a burst impeller or similar failure condition.

The inner volute 110, the outer volute 98, the compressor diffuser 108 and the insert 112 may be made from resilient materials (e.g., resilient metal(s)) that are stronger and more ductile than the material of the sacrificial impeller cover 106 (e.g., frangible metal) to facilitate the containment of the compressor impeller 36 and the fragments of the shattered impeller cover 106 during a failure condition such as burst impeller.

The shaft seal 114 is disposed radially inward of the back wall 96. The shaft seal 114 disposed radially outward of the hub end 84 of the compressor impeller 36. The shaft seal 114 is configured to control oil and air flow.

Also disclosed is a method of assembling a compressor housing 66 for a turbocharger 12 that includes a rotatable compressor impeller 36 that includes a bore 86 therethrough. The method including disposing the outer volute 98 about the bore 86, the outer volute 98 including a back wall 96 and a curved casing 116. The curved casing 116 defines an airflow-passageway 120. The back wall 96 extends radially inward from the curved casing 116. The back wall 96 includes a first receptacle 124a and a first plurality of annular steps 126a. The first receptacle 124a is configured to receive a first alignment pin 136a (that positions a compressor diffuser 108 in the compressor housing 66). The method may further comprise arranging the back wall 96 of the outer volute 98 and an impeller cover 106 to at least partially form a cavity 104 that is configured to receive the compressor impeller 36, wherein the impeller cover 106 is disposed between an inner volute 110 and the cavity 104. The impeller cover 106 is configured to fragment during impact with the compressor impeller 36 during a failure condition of the compressor impeller 36. The method may further comprise disposing the compressor diffuser 108 between the back wall 96 and the impeller cover 106. The compressor diffuser 108 includes an annular body 134, a plurality of fins 146 and the first alignment pin 136a. The fins 146 may be disposed between the annular body 134 and the impeller cover 106. The first alignment pin 136a is disposed in the first receptacle 124a of the back wall 96 of the outer volute 98. The method may further comprise disposing an inner volute 110 between the outer volute 98 and the impeller cover 106. The inner volute 110 includes a bridge 144 and an inner ring 168. The bridge 144 extends between a first end 170 and a second end 172 of the impeller cover 106. The bridge 144 and the impeller cover 106 define a chamber 142. The inner ring 168 and the bridge 144 and the impeller cover 106 define a pocket-void 174 disposed inside the chamber 142.

INDUSTRIAL APPLICABILITY

Turbochargers 12 undergo various stresses over their life span due to aerodynamic, thermal and mechanical loads.

Compressor impellors 36 may experience swings in temperature from compressor inlet variation 68 and the act of compressing the intake air. Mechanical loading from compressing the air combined with centrifugal loads during rotating can fatigue a compressor impeller 36 over time. Occasionally the compressor impeller 36 may fracture or break apart. The failure condition associated with such compressor impeller 36 failure may be referred to as a "burst impeller". Burst impeller may occur during normal operating speeds or may occur when a turbocharger 12 is operating past nominal maximum speed and temperature. When a burst impeller occurs in the latter scenario, far more energy may need to be contained and dissipated than when the burst impeller is related to fatigue failure at normal operating speeds. The disclosed compressor housing 66 provides energy dissipation and containment of material (e.g., broken compressor impeller 36 fragments, surrounding housing pieces, or the like) and oil in the compressor housing 66 during failure conditions such as burst impeller.

Compressor impellers 36 typically utilize an optimized back shape to limit bore 86 stress. However, stress optimization can add mass to the impeller shape (e.g., near the bore 86 and near the hub end 84), which can add to the energy that is released during a failure condition. To address the heavier section of the compressor impeller 36 near the bore 86, the shaft seal 114 remains clear of the compressor impeller 36 radially and a plurality of annular steps 126 integral to the outer volute 98 surround both the bulge portion 100 and the balance ring 92 of the compressor impeller 36. During the burst impeller failure condition, the blades 88 of the compressor impeller 36 typically first hit the impeller cover 106 thereby forcing a rotation of the compressor impeller 36 about the nose end 82. In the disclosed compressor housing 66, the impeller cover 106 is configured to accept and dissipate the energy from the impact of the blades 88 by shattering or fragmenting.

The annular steps 126 attenuate this rotation and force the rims 90 (of the blades 88 of the compressor impeller 36) into contact with the front side 150 and inner corner 164 of the annular body 134 compressor diffuser 108. The force of the impact of the rims 90 into the compressor diffuser 108 moves the compressor diffuser 108 in a radially outward direction. The alignment pins 136, which are provided in the turbocharger 12 to locate the compressor diffuser 108 and to facilitate the base gap 156 and the side gaps 158, provide some resistance prior to shearing off. Once the alignment pins 136 are sheared off, the compressor diffuser 108 moves radially outward toward the base end 118 of the curved casing 116. The base gap 156 together with the side gaps 158 reduce interference from the back wall 96 of the outer volute 98, which reduces cracking and damage from upward thrust of the annular body 134. The impeller cover 106 accepts and dissipates impeller energy from the blades 88 when it fragments or shatters apart.

The insert 112 attenuates movement of the nose end 82 of the compressor impeller 36 upon contact as fragments of the compressor impeller 36 progress outward. The inner volute 110 and its inner ring 168 are axially flexible to minimize longitudinal momentum and radially reinforce the structure of the compressor housing 66. The inner volute 110 is configured to slow down outward movement of the outer sections of the compressor impeller 36 (and the fragments of the impeller cover 106) so that the compressor impeller 36 and impeller cover 106 (and oil) are contained inside the outer volute 98, which acts as a final line of defense against puncture and wraps from the front of the inner volute 110 to fully around the compressor impeller 36 to attenuate the axial energy released in opposition to the force from the compressor impeller 36 striking the impeller cover 106. The combination of (a) the impeller cover 106 dissipating the energy from the failed/burst compressor impeller 36, and (b) the inner volute 110 and the outer volute 98 being made of a resilient material that is stronger than the frangible material of the impeller cover 106 prevents the fragments of the broken compressor impeller 36 from breaking through to outside of the turbocharger 12.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A compressor housing for a turbocharger that includes a rotatable compressor impeller having a bore therethrough, the compressor housing comprising:
    an outer volute configured to be disposed about the bore, the outer volute including a back wall and a curved casing, the curved casing defining an airflow-passageway, the back wall extending radially inward from the curved casing, the back wall including a receptacle and a first plurality of annular steps, the receptacle configured to receive an alignment pin that positions a compressor diffuser in the compressor housing;
    a cavity at least partially defined by the back wall of the outer volute and an impeller cover, the cavity configured to receive the compressor impeller;
    the impeller cover configured to fragment during impact with the compressor impeller during a failure condition of the compressor impeller, the impeller cover disposed between an inner volute and the cavity;
    the compressor diffuser disposed between the back wall and the impeller cover, the compressor diffuser including an annular body, a plurality of fins and the alignment pin, the fins disposed between the annular body and the impeller cover, the alignment pin disposed in the receptacle of the back wall of the outer volute; and
    the inner volute disposed between the outer volute and the impeller cover, the inner volute including a bridge and an inner ring, the bridge extending between a first end and a second end of the impeller cover, the bridge and the impeller cover defining a chamber, the inner ring and the bridge and the impeller cover defining a pocket-void disposed inside the chamber.

2. The compressor housing of claim 1, in which the back wall of the outer volute further includes an annular groove configured to receive a balance ring that projects outward from a back surface of the compressor impeller, the annular groove configured to be spaced apart from the balance ring.

3. The compressor housing of claim 2, in which the back wall of the outer volute further comprises a second plurality of annular steps, wherein the annular groove is disposed between the first plurality of annular steps and the second plurality of annular steps.

4. The compressor housing of claim 3, wherein the annular groove, the first plurality of annular steps, and the second plurality of annular steps are disposed in a front surface of the back wall, the front surface adjacent to the cavity.

5. The compressor housing of claim 2, wherein the impeller cover is made of a frangible metal.

6. The compressor housing of claim 5, in which the compressor housing further includes an insert disposed in the cavity, the insert disposed to be proximal to a nose end of the compressor impeller.

7. The compressor housing of claim 1,
in which the annular body includes a back side, and
in which the back wall includes a front surface, and
the compressor housing further comprising:
a first side gap disposed between the back side of the annular body and the front surface of the back wall.

8. The compressor housing of claim 7,
in which the curved casing includes a base end,
in which the annular body further includes an inner side and an outer side radially outward of the inner side, and
the compressor housing further comprises a base gap disposed between the base end and the outer side of the annular body.

9. A method of assembling a compressor housing for a turbocharger that includes a rotatable compressor impeller including a bore therethrough, the method including:
disposing an outer volute about the bore, the outer volute including a back wall and a curved casing, the curved casing defining an airflow-passageway, the back wall extending radially inward from the curved casing, the back wall including a receptacle and a first plurality of annular steps, the receptacle configured to receive an alignment pin that positions a compressor diffuser in the compressor housing;
arranging the back wall of the outer volute and an impeller cover to at least partially form a cavity configured to receive the compressor impeller, wherein the impeller cover is disposed between an inner volute and the cavity, the impeller cover is configured to fragment during impact with the compressor impeller during a failure condition of the compressor impeller;
disposing the compressor diffuser between the back wall and the impeller cover, the compressor diffuser including an annular body, a plurality of fins and the alignment pin, the fins disposed between the annular body and the impeller cover, the alignment pin disposed in the receptacle of the back wall of the outer volute; and
disposing the inner volute between the outer volute and the impeller cover, the inner volute including a bridge and an inner ring, the bridge extending between a first end and a second end of the impeller cover, the bridge and the impeller cover defining a chamber, the inner ring and the bridge and the impeller cover defining a pocket-void disposed inside the chamber.

10. The method of claim 9, wherein the back wall of the outer volute further includes an annular groove configured to receive a balance ring that projects outward from a back surface of the compressor impeller, the annular groove configured to be spaced apart from the balance ring.

11. The method of claim 10 in which the back wall further includes a second plurality of annular steps, wherein the annular groove, the first plurality of annular steps, and the second plurality of annular steps are disposed in a front surface of the back wall, the front surface adjacent to the cavity.

12. The method of claim 9,
wherein the annular body includes a back side, and
wherein the back wall includes a front surface, and
wherein the compressor housing further includes a plurality of side gaps disposed between a back side of the annular body and the front surface of the back wall.

13. A turbocharger that includes:
a rotatable turbocharger shaft;
a compressor impeller disposed in a cavity and mounted via a stud coupled to the rotatable turbocharger shaft, the compressor impeller including a nose end, a hub end and a plurality of blades disposed between the nose end and the hub end, each blade having a rim; and
a compressor housing comprising:
an outer volute arranged about the stud, the outer volute including a back wall and a curved casing, the curved casing defining an airflow-passageway, the back wall extending radially inward from the curved casing, the back wall proximal to and spaced apart from the compressor impeller, the back wall including a receptacle and a first plurality of annular steps, the receptacle configured to receive an alignment pin that positions a compressor diffuser in the compressor housing;
the cavity at least partially defined by the back wall of the outer volute and by an impeller cover;
the impeller cover configured to fragment during impact with the compressor impeller during a failure condition of the compressor impeller, the impeller cover disposed between an inner volute and the compressor impeller;
the compressor diffuser disposed between the back wall and the impeller cover, the compressor diffuser including an annular body, a fin and the alignment pin, the fin extending from the annular body to the impeller cover, the alignment pin disposed in the receptacle of the back wall of the outer volute;
the inner volute disposed between the outer volute and the impeller cover, the inner volute including a bridge and an inner ring, the bridge extending from a first end to a second end of the impeller cover, the bridge and the impeller cover defining a chamber, the inner ring and the bridge and the impeller cover defining a pocket-void disposed inside the chamber.

14. The turbocharger of claim 13, in which the compressor impeller includes a balance ring and in which the back wall of the outer volute further comprises:
a second plurality of annular steps; and
an annular groove disposed between the first plurality of annular steps and the second plurality of annular steps, wherein the balance ring is disposed in the annular groove.

15. The turbocharger of claim 14,
in which the curved casing includes a base end, and
in which the annular body includes a back side, and
in which the back wall includes a front surface, and
the compressor housing further comprising:

a plurality of side gaps disposed between a back side of the annular body and the front surface of the back wall, wherein each of the side gaps are slit-like, wherein the base end and the front surface of the back wall define a recess having a sidewall and a floor, wherein further the annular body is disposed in the recess to extend along the floor.

16. The turbocharger of claim 13, in which the back wall of the outer volute further comprises an annular groove, and in which the compressor impeller includes a balance ring extending toward the back wall, and in which the compressor impeller further comprises a bulge portion disposed between the balance ring and the hub end, wherein the bulge portion is disposed radially inward of the annular groove and is disposed between the annular groove and the hub end.

17. The turbocharger of claim 16, in which the curved casing includes a base end, in which the annular body further includes an inner side and an outer side radially outward of the inner side, and the compressor housing further comprises a base gap disposed between the base end and the outer side of the annular body.

18. The turbocharger of claim 17, wherein the compressor housing further includes a blade gap disposed directly between the rim of each blade and the inner side of the annular body, the rim radially aligned with an inner corner of the inner side of the annular body, an outer corner of the inner side radially aligned with the first plurality of annular steps and free of radial alignment with the rim of each blade.

19. The turbocharger of claim 13, in which the compressor housing further includes an insert disposed in the cavity, the insert configured to be disposed proximal to a nose end of the compressor impeller.

20. The turbocharger of claim 13 further comprising:

a turbine housing connected to the compressor housing;

a turbine wheel rotatably disposed within the turbine housing and configured to be rotated by exhaust received from an engine, the turbine wheel operably connected to the compressor impeller.

* * * * *